(12) United States Patent
Freshour

(10) Patent No.: US 10,031,037 B1
(45) Date of Patent: Jul. 24, 2018

(54) STRESSROLL LOAD CELLS AND METHODS FOR MEASURING EFFECTS OF OFF-AXIS LOADS

(71) Applicant: GOODRICH CORPORATION, Charlotte, NC (US)

(72) Inventor: Thomas Freshour, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/595,198

(22) Filed: May 15, 2017

(51) Int. Cl.
  *G01L 5/16* (2006.01)
  *G01L 1/22* (2006.01)
(52) U.S. Cl.
  CPC ............ *G01L 5/161* (2013.01); *G01L 1/2218* (2013.01)
(58) Field of Classification Search
  CPC .............................. G01L 5/161; G01L 1/2218
  USPC ...................... 73/862.041–862.046
  See application file for complete search history.

(56) References Cited

U.S. PATENT DOCUMENTS

| 2,431,696 | A | * | 12/1947 | Keister | .................. G06G 7/62 324/443 |
| 4,261,429 | A | * | 4/1981 | Lockery | .............. G01G 3/1404 177/211 |
| 4,453,609 | A | | 6/1984 | Griffen et al. | |
| 6,910,392 | B2 | | 6/2005 | Lockery et al. | |
| 9,016,134 | B2 | | 4/2015 | Freshour | |
| 9,250,158 | B2 | * | 2/2016 | Shimoyama | .......... G01L 5/0009 |
| 9,548,643 | B2 | | 1/2017 | Rehfus et al. | |

* cited by examiner

*Primary Examiner* — Jonathan Dunlap
*Assistant Examiner* — Octavia Hollington
(74) *Attorney, Agent, or Firm* — Snell & Wilmer, L.L.P.

(57) ABSTRACT

A stressroll assembly may comprise a first bracket comprising a first load cell. The first load cell may form a first half of a Wheatstone bridge. A first stressroll wheel may be mounted to a first axle extending between a first arm of the first bracket and a second arm of the first bracket. A second bracket may comprise a second load cell. The second load cell may form a second half of the Wheatstone bridge. A second stressroll wheel may be mounted to a second axle extending between a first arm of the second bracket and a second arm of the second bracket.

19 Claims, 10 Drawing Sheets

Gauge 201  Gauge 203

STRESSROLL LOAD CELLS AND METHODS FOR MEASURING EFFECTS OF OFF-AXIS LOADS

FIELD

The present disclosure relates to load cells, and more particularly, to load cells for a stressroll assembly.

BACKGROUND

Aircraft wheels are an important component of a landing gear system. With tires mounted upon them, wheels support the entire weight of the aircraft during taxi, takeoff, and landing. Accordingly, a wheel may experience significant tensile loads, particularly during landing. To strengthen the wheel and/or reduce occurrences of cracking at the wheel's surface, a compressive stress may be applied to the wheel during the manufacturing process. The force applied to the wheel during this "stressrolling" process may be sensed by a load cell. An off-axis or "side load" may cause the body of the load cell to deflect and/or deform, creating inaccuracies in the measurement of the force being applied to the wheel.

SUMMARY

In various embodiments, the present disclosure provides a stress load measurement system for a stressroll assembly. A stress load measurement system for a stressroll assembly may comprise a first bracket comprising a first load cell, and a second bracket comprising a second load cell. The first load cell may include a first strain gauge and a second strain gauge mounted to a first arm of the first bracket, and a third strain gauge and a fourth strain gauge mounted to a second arm of the first bracket. The second load cell may include a fifth strain gauge and a sixth strain gauge mounted to a first arm of the second bracket, and a seventh strain gauge and an eighth strain gauge mounted to a second arm of the second bracket. The first load cell may form a first half of a Wheatstone bridge and the second load cell may form a second half of the Wheatstone bridge.

In various embodiments, the first strain gauge and the third strain gauge may be connected to a positive power supply terminal and a positive signal supply terminal. The fifth strain gauge and the seventh strain gauge may be connected to a negative power supply terminal and a negative signal supply terminal. A first stressroll wheel may be mounted to a first axle. The first axle may extend between the first arm of the first bracket and the second arm of the first bracket. A second stressroll wheel may be mounted to a second axle. The second axle may extend between the first arm of the second bracket and the second arm of the second bracket.

In various embodiments, the first strain gauge may be configured to measure at least one of a tension or a compression along a first length of the first arm of the first bracket, and the third strain gauge may be configured to measure at least one of a tension or a compression along a length of the second arm of the first bracket. The first strain gauge may be coupled to a first multimeter and the third strain gauge may be coupled to a second multimeter. A transmitter may be coupled to the first load cell and the second load cell. The second strain gauge may be oriented orthogonal to the first strain gauge, and the fourth strain gauge may be oriented orthogonal to the third strain gauge. The fifth strain gauge may be configured to measure at least one of a tension or a compression along a length of the first arm of the second bracket, and the seventh strain gauge may be configured to measure at least one of a tension or a compression along a length of the second arm of the second bracket.

A stressroll assembly may comprise a first bracket comprising a first load cell. The first load cell may form a first half of a Wheatstone bridge. A first stressroll wheel may be mounted to a first axle. The first axle may extend between a first arm of the first bracket and a second arm of the first bracket. A second bracket may comprise a second load cell. The second load cell may form a second half of the Wheatstone bridge. A second stressroll wheel may be mounted to a second axle. The second axle may extend between a first arm of the second bracket and a second arm of the second bracket.

In various embodiments, the first load cell may comprise a first strain gauge mounted to the first arm of the first bracket, and a second strain gauge mounted to the second arm of the first bracket. The first strain gauge and the second strain gauge may be connected to a positive power supply terminal and a positive signal supply terminal. The second load cell may comprise a third strain gauge mounted to the first arm of the second bracket and a fourth strain gauge mounted to the second arm of the second bracket. The third strain gauge and the fourth strain gauge may be connected to a negative power supply terminal and a negative signal supply terminal. A transmitter may be coupled to the first load cell and the second load cell.

In various embodiments, the first stressroll wheel may be configured to apply a first compressive force to a wheel, and the second stressroll wheel may be configured to apply a second compressive force to the wheel. The first stressroll wheel may be configured to apply the first compressive force to a bead seat on the wheel.

A method of measuring force applied during a stressroll process may comprise coupling a first bracket comprising a first load cell to a first stressroll wheel, and coupling a second bracket comprising a second load cell to a second stressroll wheel. The first load cell may form a first half of a Wheatstone bridge, and the second load cell may form a second half of the Wheatstone bridge.

In various embodiments, the first load cell may comprise a first strain gauge coupled to a first arm of the first bracket, and a second strain gauge coupled to a second arm of the first bracket. The method may further comprise coupling a first multimeter to a first output of the first strain gauge, coupling a second multimeter to a second output of the second strain gauge, and comparing the first output to the second output.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
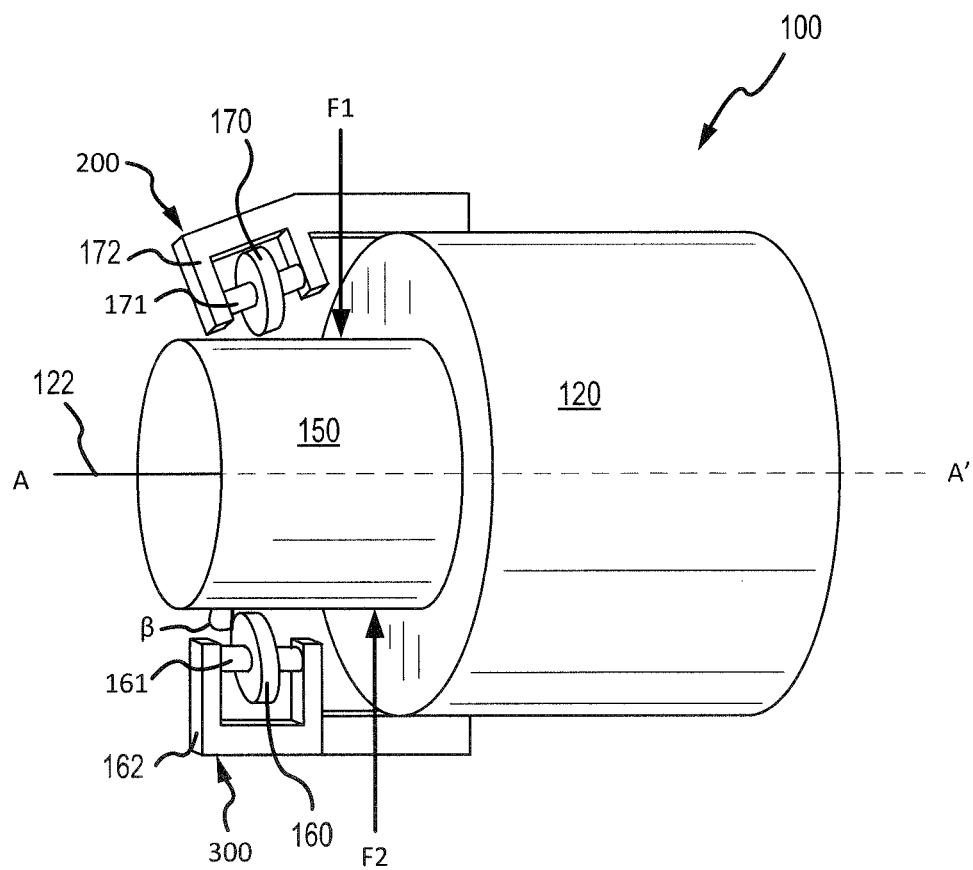
FIG. 1 illustrates a perspective view of a stressroll assembly, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

A stressroll assembly may be used to apply a compressive force to an aircraft wheel to "pre-stress" the aircraft wheel. The compressive force may be applied to the aircraft wheel using a spring loaded stressroll wheel. The stressroll wheel is brought into contact with the aircraft wheel and applies a compressive force to the aircraft wheel's surface. Stressroll assemblies may comprise load cells configured to measure a load, or amount of force, being applied by the stressroll wheel. The present disclosure describes a stress load measurement system for a stressroll assembly. The stress load measurement system may comprise load cells having strain gauges configured to sense and balance and/or sense and cancel off-axis loads generated during the stressroll process.

With reference to FIG. 1, a perspective view of a stressroll assembly 100 is shown, in accordance with various embodiments. Stressroll assembly 100 may be configured to apply compressive force to an aircraft wheel 150. For example, as aircraft wheel 150 spins about axis of rotation 122, a first stressroll wheel 170 may be brought into contact with aircraft wheel 150. Stressroll wheel may apply a first compressive force F1 to aircraft wheel 150. In various embodiments, first force F1 may be a radial load which is applied normal to axis of rotation 122.

Stressroll wheel 170 may be mounted to an axle 171. Axle 171 may be coupled between two arms of a bracket 172. Bracket 172 may be configured to support stressroll wheel 170. Bracket 172 may comprise a load cell 200. Load cell 200 may be configured to measure the force F1 applied to aircraft wheel 150 by stressroll wheel 170.

In various embodiments, stressroll wheel 170 may comprise hardened steel. In various embodiments, a diameter of stressroll wheel 170 may be between 4 inches and 8 inches (i.e., between 10.16 cm and 20.32 cm). In various embodiments, a diameter of stressroll wheel 170 may be between 5.5 inches and 6.5 inches (i.e., between 13.97 cm and 16.51 cm). In various embodiments, stressroll wheel 170 may be configured to apply force F1 to particular areas of aircraft wheel 150.

Figure 2:
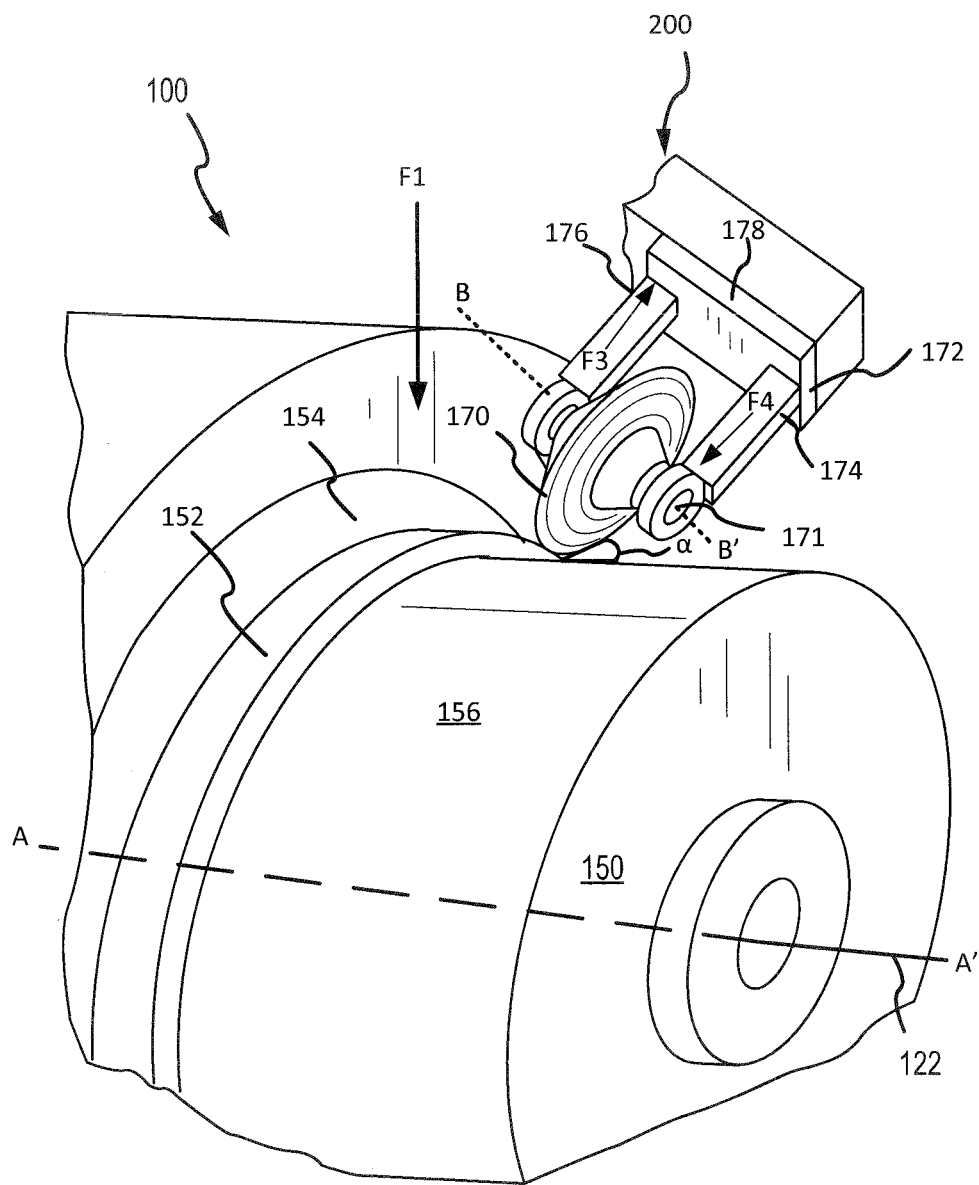
FIG. 2 illustrates a perspective view of a stressroll wheel, in accordance with various embodiments.

With reference to FIG. 2, stressroll wheel 170 is illustrated applying compressive force F1 to aircraft wheel 150, in accordance with various embodiments. In various embodiments, stressroll wheel 170 may first contact aircraft wheel 150 at or near a radially outward edge of a flange 154 on aircraft wheel 150. After rolling across flange 154, stressroll wheel 170 may roll across a bead seat area 152 of aircraft wheel 150. In various embodiments, stressroll wheel 170 may then roll across tube well portion 156 of aircraft wheel 150. An angle α between aircraft wheel 150 and stressroll wheel 170 may change throughout the stressroll process. In various embodiments, when stressroll wheel 170 applies compressive force F1 to bead seat area 152, angle α may be between about 30° and about 40°, as used herein the term "about" means±1.0°. In various embodiments, when stressroll wheel 170 applies compressive force F1 to bead seat area 152, angle α may be between about 33.0° and about 35.0°, as used herein the term "about" means±1.0°.

Stressroll wheel 170 contacting aircraft wheel 150 at angle α may generate an off-axis load (also reference to as a "side load") through arms 174 and 176 of bracket 172. Stated differently, at angle α, the force F1 applied to aircraft wheel 150 may not be normal to the axis of rotation B-B' of axle 171 and stressroll wheel 170, and may cause a force F3 (e.g., a tension or compression) applied to arm 176 to differ from a force F4 (e.g., a tension or compression) applied to arm 174. The difference in forces acting upon arms 174 and 176 may affect an accuracy of the measurement of force F1. In various embodiments, and as discussed in further detail below, load cell 200 may include a plurality of strain gauges configured to sense and cancel and/or sense and balance the off-axis loads (e.g., force F3 and F4) applied to arms 174 and 176.

Returning to FIG. 1, stressroll assembly 100 may comprise a second stressroll wheel 160. In various embodiments, stressroll assembly 100 may be configured such that after stressroll wheel 170 has rolled across bead seat area 152 and/or tube well portion 156 (FIG. 2), stressroll wheel 170 may lift up (i.e., move away from aircraft wheel 150), and stressroll wheel 160 may move into contact with aircraft wheel 150. Stressroll wheel 160 may be configured to apply a compressive force F2 to aircraft wheel 150. In various embodiments, force F2 may be a radial load, which is applied normal to axis of rotation 122.

Stressroll wheel 160 may be mounted to an axle 161. Axle 161 may be coupled between two arms of a bracket 162. Bracket 162 may be configured to support stressroll wheel 160. Bracket 162 may comprise a load cell 300. Load cell 300 may be configured to measure the force F2 applied to aircraft wheel 150.

In various embodiments, stressroll wheel 160 may comprise hardened steel. In various embodiments, a diameter of stressroll wheel 160 may be between 4 inches and 8 inches (i.e., between 10.16 cm and 20.322 cm). In various embodiments, a diameter of stressroll wheel 160 may be between 5.5 inches and 6.5 inches (i.e., between 13.97 cm and 16.51 cm).

In various embodiments, stressroll wheel 160 applies compressive force F2 to an area of aircraft wheel 150 that is different from the area stressrolled by stressroll wheel 170. For example, stressroll wheel 160 may apply compressive force F2 to a lock ring portion and/or an O-ring groove of aircraft wheel 150. Stressroll wheel 160 may contact aircraft wheel 150 at an angle β. In various embodiments, angle β may be between about 80° and about 100°, as used herein the term "about" means±1.0°. In various embodiments, angle β may be between about 88° and about 92°, as used herein the term "about" means±1.0°.

Figure 3A:
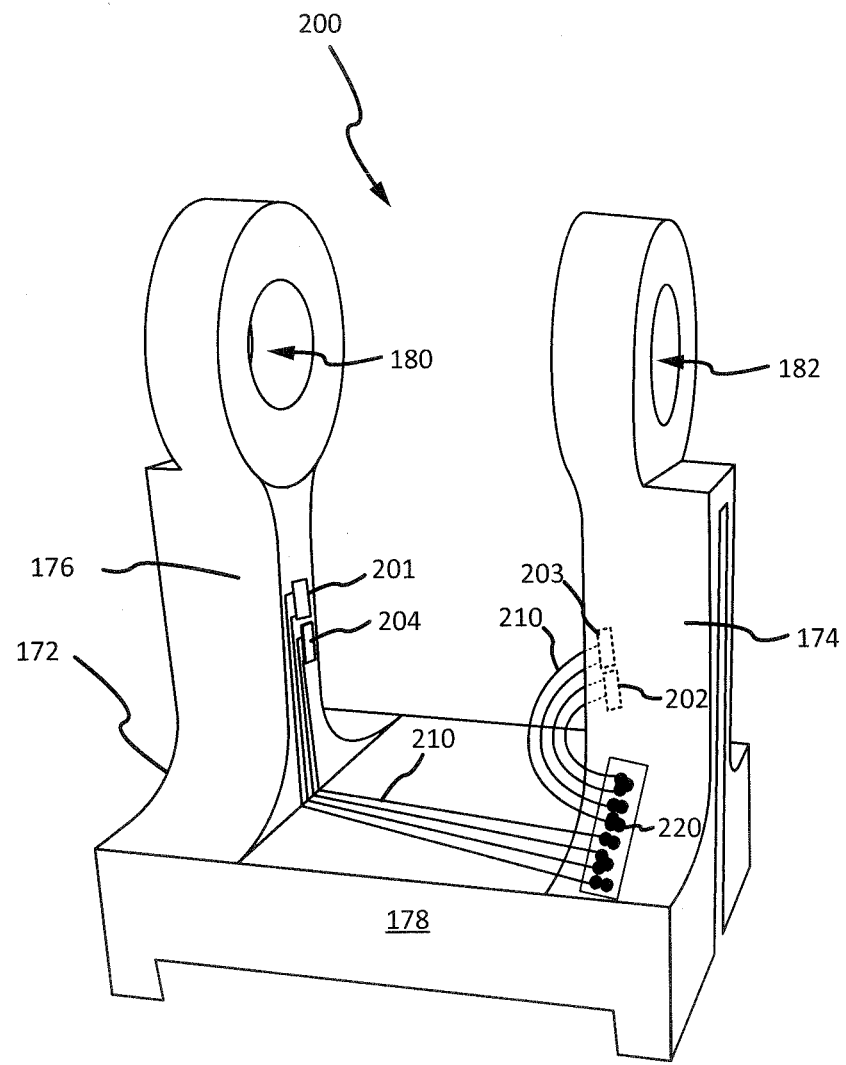
FIGS. 3A and 3B illustrate a perspective view of brackets comprising load cells, in accordance with various embodiments.
Figure 3B:
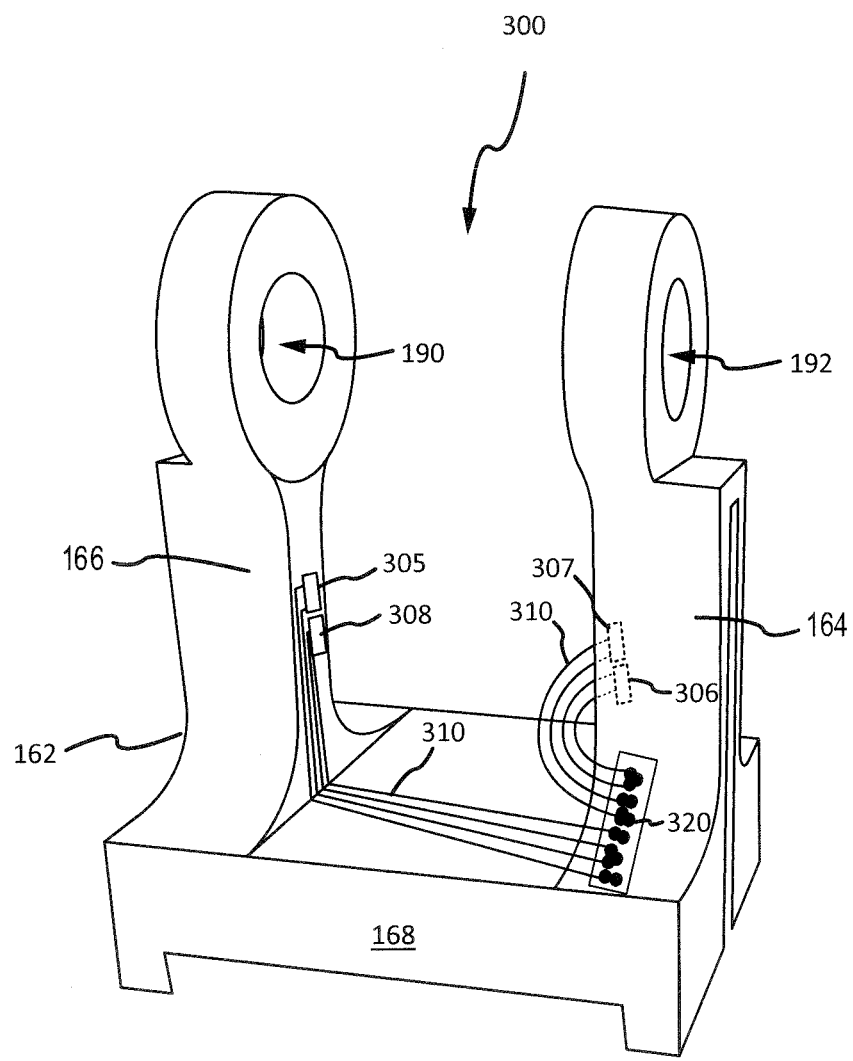

With reference to FIG. 1 and FIG. 3B, stressroll wheel 160 contacting aircraft wheel 150 at angle β may create an off-axis, or side load, through arm 164 and arm 166 of bracket 162. Stated differently, force F2 may not be normal to the axis of rotation of axle 161 and stressroll wheel 160, and may cause a force (e.g., a tension or compression) applied to arm 166 to differ from a force (e.g., a tension or compression) applied to arm 164. The difference in forces acting upon arms 164 and 166 may affect measurement of force F2. In various embodiments, and as discussed in further detail below, load cell 300 includes a plurality of strain gauges configured to sense and cancel and/or sense and balance the off-axis loads applied to arms 164 and 166 of bracket 162.

With reference to FIG. 3A, bracket 172, including load cell 200, is illustrated, in accordance with various embodiments. Bracket 172 includes an arm 174 and an arm 176. Arms 174 and 176 extend orthogonally from a base 178 of bracket 172. An end of arm 176 that is distal to base 178 includes an opening 180. An end of arm 174 that is distal to base 178 includes an opening 182. Openings 180 and 182 may be configured to receive axle 171, with momentary reference to FIG. 1. Arms 174 and 176 may form the body of load cell 200. In various embodiments, load cell 200 comprises a plurality of strain gauges mounted to arms 174 and 176 of bracket 172. In various embodiments, two strain gauges may be mounted to each arm of bracket 172. For example, a strain gauge 201 and a strain gauge 204 may be mounted to arm 176, and a strain gauge 203 and a strain gauge 202 may be mounted to arm 174.

Strain gauges 201, 202, 203, and 204 may each be attached to a substantially flat portion of arms 174 and 176. Strain gauges 201 and 204 may be positioned and wired in a manner such that they measure tension and/or compression along a length of arm 176, wherein the length of arm 176 extends along arm 176 in a direction normal to base 178. Strain gauges 203 and 202 may be positioned and wired in a manner such that they measure tension and/or compression along a length of arm 174, wherein the length of arm 174 extends along arm 174 in a direction normal to base 178.

In various embodiments, strain gauge 201 and strain gauge 203 may be installed 180° apart, such that strain gauge 201 (e.g., first principle strain gauge) and strain gauge 203 (e.g., second principle strain gauge) are installed on the inner surfaces of opposing arms 176 and 174, respectively. In various embodiments, strain gauge 204 and strain gauge 202 may similarly be installed 180° apart (i.e., on the inner surfaces of opposing arms 176 and 174, respectively) and may be oriented orthogonal to strain gauges 201 and 203, respectively. In this regard, strain gauges 201 and 204 may comprise a first set of biaxial strain gauges, and strain gauges 203 and 202 may comprise a second set of biaxial strain gauges. As discussed herein, each strain gauge 201, 202, 203, and 204 may comprise or be configured with one or more wires 210 connecting the strain gauge to a wiring connector 220.

Strain gauges 201 and 204 may be configured to measure load in any suitable direction relative to arm 176. For instance, strain gauges 201 and 204 may be configured to measure at least one of a linear load and a bending load on arm 176 of bracket 172. In various embodiments, as arm 176 deforms (e.g., bends and/or experiences compression force and/or tension force), strain gauges 201 and 204 deform. The deformation of strain gauges 201 and 204 causes a change in the electrical resistance of strain gauges 201 and 204.

Strain gauges 203 and 202 may be configured to measure load in any suitable direction relative to arm 174. For instance, strain gauges 203 and 202 may be configured to measure at least one of a linear load and a bending load on arm 174 of bracket 172. In various embodiments, as arm 174 deforms (e.g., bends and experiences a compression force or tension force) strain gauges 203 and 202 deform. The deformation of strain gauges 203 and 202 causes a change in the electrical resistance of strain gauges 203 and 202. As discussed below, the change in resistance of strain gauges 203 and 202 may be compared to the change in resistance of strain gauges 201 and 204 using a Wheatstone bridge.

With reference to FIG. 3B, bracket 162 including load cell 300, is illustrated, in accordance with various embodiments. Bracket 162 includes an arm 164 and an arm 166. Arms 164 and 166 extend orthogonally from a base 168. An end of arm 166 that is distal to base 168 includes an opening 190. An end of arm 164 that is distal to base 168 includes an opening 192. Openings 190 and 192 may be configured to receive axle 161, with momentary reference to FIG. 1. Arms 164 and 166 may form the body of load cell 300. In various embodiments, load cell 300 comprises a plurality of strain gauges mounted to arms 164 and 166 of bracket 162. In various embodiments, two strain gauges may be mounted to each arm of bracket 162. For example, a strain gauge 305 and a strain gauge 308 may be mounted to arm 166, and a strain gauge 307 and a strain gauge 306 may be mounted to arm 164.

Strain gauges 305, 306, 307, and 308 may each be attached to a substantially flat portion of arms 164 and 166.

Strain gauges 305 and 308 may be positioned and wired in a manner such that they measure tension and/or compression along a length of arm 166, wherein the length of arm 166 extends along arm 166 in a direction normal to base 168. Strain gauges 307 and 306 may be positioned and wired in a manner such that they measure tension and/or compression along a length of arm 164, wherein the length of arm 164 extends along arm 164 in a direction normal to base 168.

In various embodiments, strain gauge 305 and strain gauge 307 may be installed 180° apart, such that strain gauge 305 (e.g., first principle strain gauge) and strain gauge 307 (e.g., second principle strain gauge) are installed on the inner surfaces of opposing arms 166 and 164, respectively. In various embodiments, strain gauge 308 and strain gauge 306 may similarly be installed 180° apart (i.e., on the inner surfaces of opposing arms 166 and 164, respectively) and may be oriented orthogonal to strain gauges 305 and 307, respectively. In this regard, strain gauges 305 and 308 may comprise a first set of biaxial strain gauges, and strain gauges 307 and 306 may comprise a second set of biaxial strain gauges. As discussed herein, each strain gauge 305, 306, 307, and 308 may comprise or be configured with one or more wires 310 connecting the strain gauge to a wiring connector 320.

Strain gauges 305 and 308 may be configured to measure load in any suitable direction relative to arm 166. For instance, strain gauges 305 and 308 may be configured to measure at least one of a linear load and a bending load on arm 166 of bracket 162. In various embodiments, as arm 166 deforms (e.g., bends and experiences a compression force or a tension force), strain gauges 305 and 308 deform. The deformation of strain gauges 305 and 308 causes a change in the electrical resistance of strain gauges 305 and 308.

Strain gauges 307 and 306 may be configured to measure load in any suitable direction relative to arm 164. For instance, strain gauges 307 and 306 may be configured to measure at least one of a linear load and a bending load on arm 164 of bracket 162. In various embodiments, as arm 164 deforms (e.g., bends and experiences a compression force or a tension force), strain gauges 307 and 306 deform. The deformation of strain gauges 307 and 306 causes a change in the electrical resistance of strain gauges 307 and 306. As discussed below, the change in resistance of strain gauges 307 and 306 may be compared to the change in resistance of strain gauges 305 and 308 using a Wheatstone bridge.

Figure 4A:
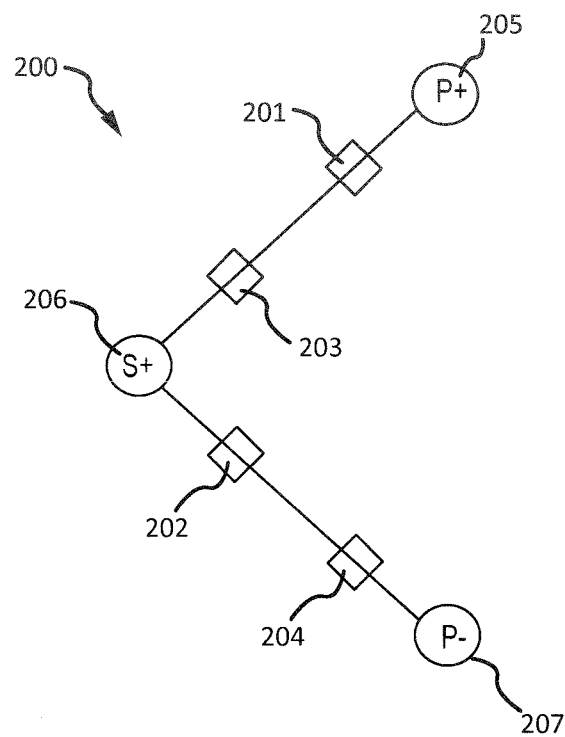
FIGS. 4A and 4B illustrate a schematic view of a stress load measurement system comprising strain gauges configured in a Wheatstone bridge, in accordance with various embodiments.
Figure 4B:
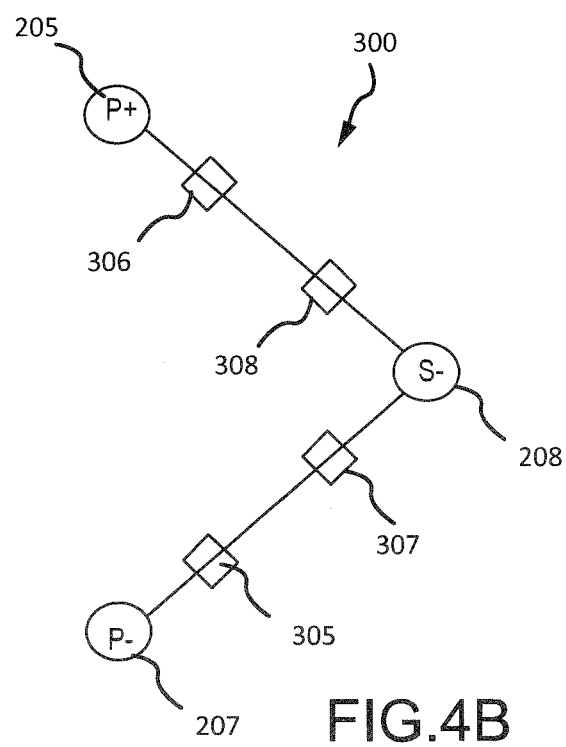

With combined reference to FIG. 4A and FIG. 4B, in various embodiments, load cell 200, comprising strain gauges 201, 202, 203, and 204, forms a first half of a Wheatstone bridge, and load cell 300, comprising strain gauges 305, 306, 307, and 308, forms a second half of the Wheatstone bridge. As shown in FIG. 4A, strain gauge 201 and strain gauge 203 may form a first leg of the Wheatstone bridge and may each be connected to a positive power supply (P+) terminal 205 and a positive signal supply (S+) terminal 206. Strain gauge 202 and strain gauge 204 may form a second leg of the Wheatstone bridge and may each be connected to the S+ terminal 206 and a negative power supply (P−) terminal 207. As shown in FIG. 4B, strain gauge 305 and strain gauge 307 may form a third leg of the Wheatstone bridge and may each be connected to the P− terminal 207 and a negative signal supply (S−) terminal 208. Strain gauge 308 and strain gauge 306 may form a fourth leg of the Wheatstone bridge and may each be connected to the S− terminal 208 and the P+ terminal 205.

With reference to FIGS. 3A and 3B and FIGS. 4A and 4B, locating a one half of the Wheatstone bridge on bracket 172 and the other half of the Wheatstone bridge on bracket 162 may provide a means for checking that load cell 200 and load cell 300 are cancelling side load. For example, when side load is cancelled, the ratio of the resistance of strain gauge 201 to the resistance of strain gauge 204 should be about equal to the ratio of the resistance of strain gauge 203 to the resistance of strain gauge 202, and the ratio of the resistance of strain gauge 305 to the resistance of strain gauge 308 should be about equal to the ratio of the resistance of strain gauge 307 to the resistance of strain gauge 306, as used herein "about equal" means±5%. When the ratios of the resistances are about equal (i.e., when load cells 200 and 300 are cancelling side load) a voltage between S+ terminal 206 and S− terminal 208 should be about zero, as used herein "about zero" means±3 millivolts. In various embodiments, strain gauges 201, 202, 203, and 204 of load cell 200 and strain gauges 305, 306, 307, and 308 of load cell 300 can be electrically coupled to other systems, such as a power source and a multimeter to measure the voltage between S+ terminal 206 and S− terminal 208 (i.e., to measure the change in the resistance of the strain gauges).

Figure 4C:
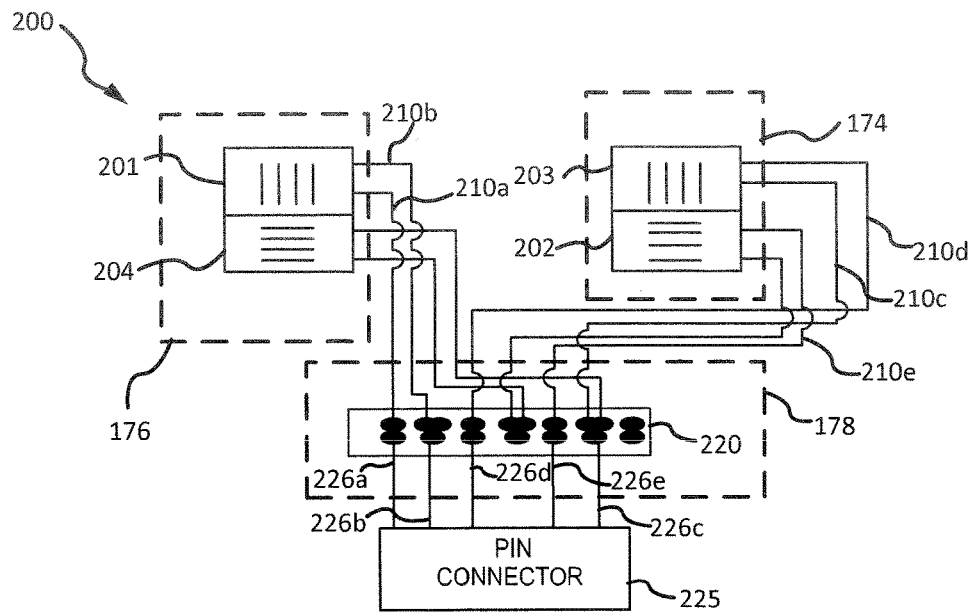
FIGS. 4C and 4D illustrate a schematic view of a first load cell coupled to a bridge completion unit, in accordance with various embodiments.
Figure 4D:
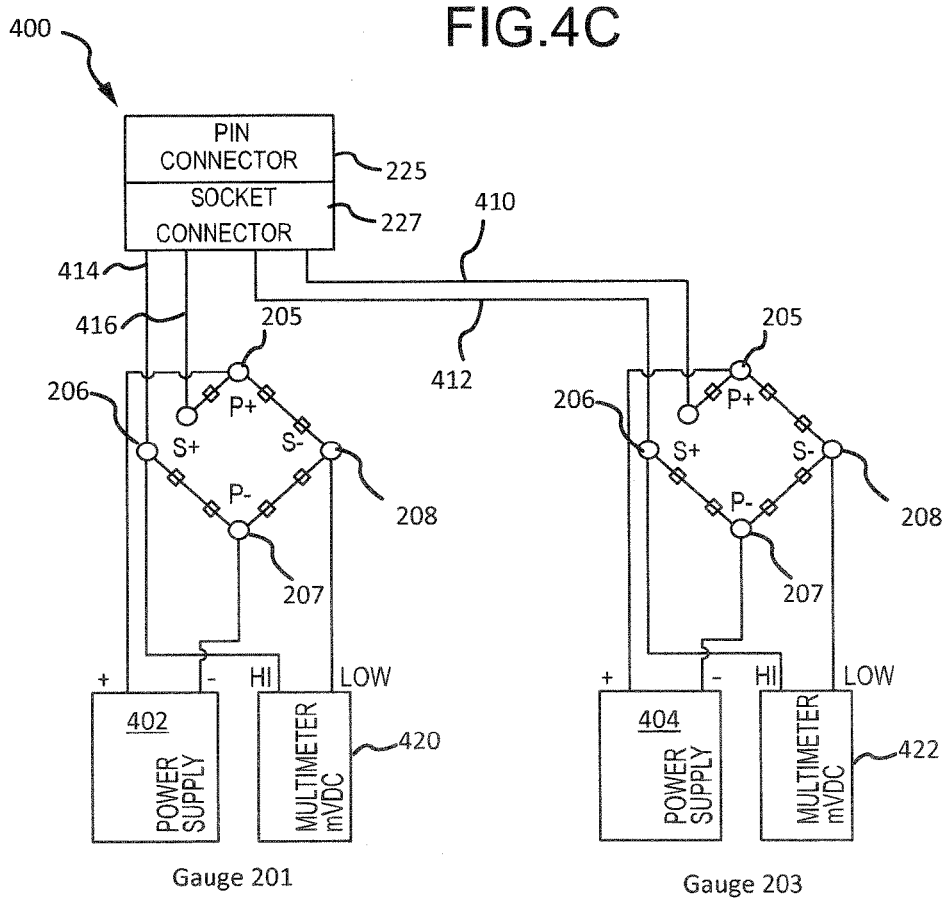

With reference to FIG. 4C and FIG. 4D, in various embodiments, load cell 200 may be wired or otherwise electrically coupled to a bridge completion unit 400. Bridge completion unit 400 may include a first power supply unit 402 and a second power supply unit 404. Bridge completion unit 400 may include a first multimeter 420 and a second multimeter 422. In various embodiments, an output of strain gauge 201 may be routed to first multimeter 420 and an output of strain gauge 203 may be routed to second multimeter 422.

Load cell 200 may be wired and/or configured such that the strain gauges on each arm of bracket 172 can be connected to bridge completion unit 400 for calibration and/or accuracy testing of load cell 200. Stated another way, the strain gauges of load cell 200 may be connected to bridge completion unit 400 to ensure the strain gauges are working properly and are balancing and/or cancelling side load accurately. In accordance with various embodiments, wires 210 electrically connect strain gauges 201, 202, 203, and 204 to wiring connector 220. In various embodiments, wiring connector 220 may be coupled or otherwise bonded to base 178 of bracket 172. A pin connector 225 may be electrically coupled to wiring connector 220. Pin connector 225 may be coupled to wiring connector 220 via a plurality of wires 226a, 226b, 226c, 226d, and 226e. In various embodiments, pin connector 225 may be a threaded 5-pin connector.

Pin connector 225 may be engaged or otherwise electrically coupled to a socket connector 227 of bridge completion unit 400. In various embodiments, socket connector 227 may be a 5-socket straight connector. A wire 414 may be electrically coupled to socket connector 227 and an S+ terminal 206 of multimeter 420. In various embodiments, strain gauge 201 may be electrically connected to S+ terminal 206 of multimeter 420 via wire 210a, wiring connector 220, wire 226a, pin connector 225, socket connector 227, and wire 414. A wire 416 may be electrically connected between socket connector 227 and a P+ terminal 205 of power supply unit 402. In various embodiments, power supply unit 402 supplies a direct current (DC), for example, 5 volts (V) to 7 V DC.

In various embodiments, strain gauge 201 may be electrically connected to P+ terminal 205 of power supply unit 402 via wire 210b, wiring connector 220, wire 226b, pin connector 225, socket connector 227, and wire 416. A wire 410 may be electrically connected between socket connector 227 and a P+ terminal 205 of power supply unit 404. In various embodiments, strain gauge 203 may be coupled to the P+ terminal of power supply unit 404 via wire 210c, wiring connector 220, a wire 226c, pin connector 225, socket connector 227, and wire 410. In various embodiments, power supply unit 404 supplies DC, for example, a 5 V to 7 V DC. A wire 412 may be electrically connected between socket connector 227 and a S+ terminal 206 of multimeter 422. In various embodiments, strain gauge 203 may be coupled to the S+ terminal of multimeter 422 via wire 210d, wiring connector 220, wire 226d, pin connector 225, socket connector 227, and wire 412.

In various embodiments, upon connecting load cell 200 to bridge completion unit 400, a load may be applied to stressroll wheel 170 (FIG. 1) and the outputs from strain gauge 201 and strain gauge 203 may be compared to confirm load cell 200 is canceling and/or balancing off-axis loading. For example, the output of strain gauge 201 may be routed to multimeter 420 and the output of strain gauge 203 may be routed to multimeter 422. The voltage measured by multimeter 420 is compared to the voltage measured by multimeter 422. In various embodiments, multimeters 420 and 422 display, or measure, voltage in millivolts. If load cell 200 is accurately measuring, balancing, and/or cancelling side loads experienced by arm 174 and arm 176, multimeter 420 and multimeter 422 will display about the same voltage, as used herein "about the same voltage" means±5.0%.

Multimeter 420 and multimeter 422 displaying different voltages may indicate that at least one of strain gauges 201, 202, 203, or 204 is not oriented correctly. For example, strain gauge 204 not being oriented at a 90° angle relative to strain gauge 201 may result in multimeter 420 and multimeter 422 displaying unequal voltages. Multimeter 420 and multimeter 422 displaying different voltages may be indicative of a poor bonding between at least one of the strain gauges 201, 202, 203, or 204 and arm 174 or arm 176. Multimeter 420 and multimeter 422 displaying unequal voltages may indicate that the load cell body (i.e., bracket 172) is not machined correctly. For example, with momentary reference to FIG. 3A, arm 174 having a greater thickness than arm 176 may affect output of at least one of the strain gauges 201, 202, 203, or 204.

With reference to FIG. 1, testing an accuracy of load cell 200 may help ensure a correct load is being applied to aircraft wheel 150. For example, if load cell 200 is not cancelling and/or balancing off-axis load, too much force F1 or too little force F1 may be applied to aircraft wheel 150. Applying an incorrect amount of force during a stressrolling of aircraft wheel 150 may decrease a reliability of aircraft wheel 150 and may lead to premature failure of aircraft wheel 150. Calibrating and/or testing load cell 200 to ensure any off-axis load is being properly balanced and/or cancelled may allow for a more exact and more accurate measurement of the compressive force F1 being applied to aircraft wheel 150 by stressroll wheel 170.

Figure 4E:
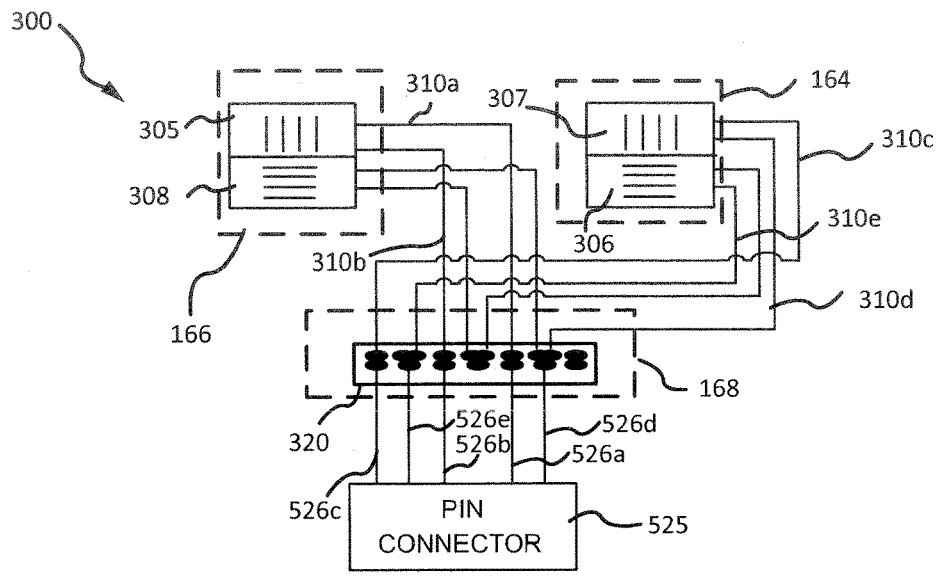
FIGS. 4E and 4F illustrate a schematic view of a second load cell coupled to a bridge completion unit, in accordance with various embodiments.
Figure 4F:
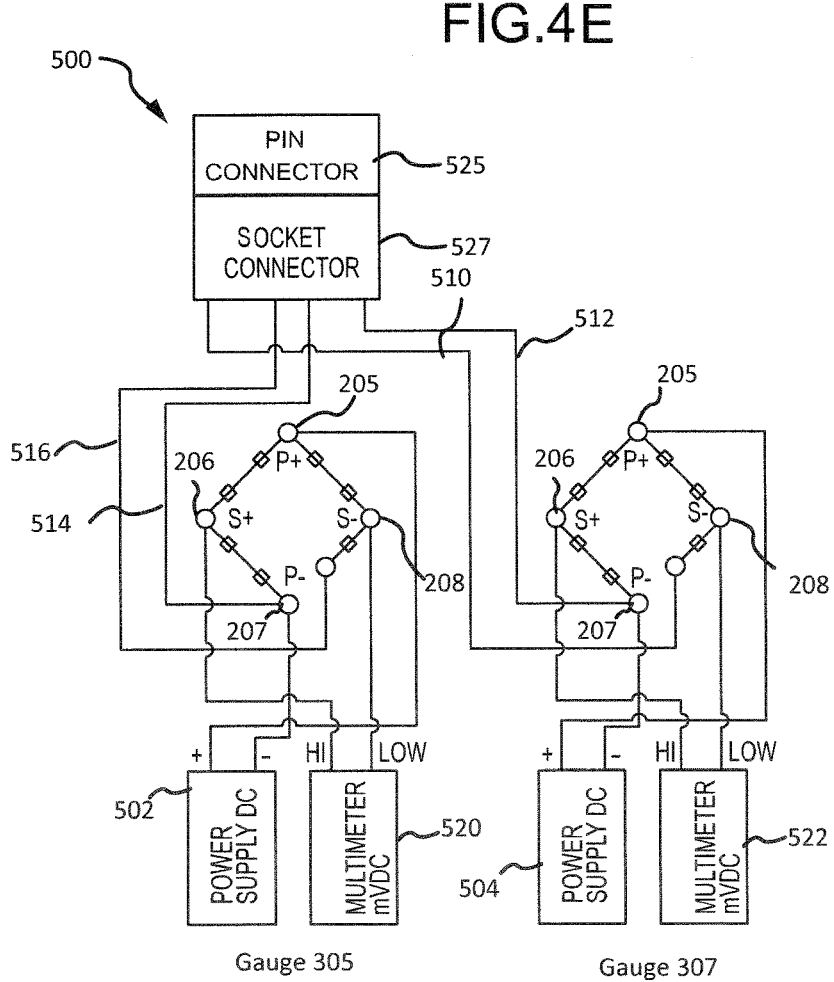

With reference to FIG. 4E and FIG. 4F, in various embodiments, load cell 300 may be wired or otherwise electrically coupled to a bridge completion unit 500. Bridge completion unit 500 may include a first power supply unit 502 and a second power supply unit 504. Bridge completion unit 500 may include a first multimeter 520 and a second multimeter 522. In various embodiments, an output of strain gauge 305 may be routed to first multimeter 520 and an output of strain gauge 307 may be routed to second multimeter 522.

Load cell 300 may be wired and/or configured such that the strain gauges on each arm of bracket 162 (FIG. 3B) can be connected to bridge completion unit 500 for calibration and/or accuracy testing of load cell 300. Stated another way, the strain gauges of load cell 300 may be connected to bridge completion unit 500 to confirm the strain gauges are working properly and balancing and/or cancelling side load accurately. In accordance with various embodiments, wires 310 electrically connect strain gauges 305, 306, 307, and 308 to wiring connector 320. In various embodiments, wiring connector 320 may be coupled or otherwise bonded to base 168 of bracket 162, with momentary reference to FIG. 3B. A pin connector 525 may be electrically coupled to wiring connector 320. Pin connector 525 may be coupled to wiring connector 320 via a plurality of wires 526a, 526b, 526c, 526d, and 526e. In various embodiments, pin connector 525 may be a threaded 5-pin connector.

Pin connector 525 may be engaged or otherwise electrically coupled to a socket connector 527 of bridge completion unit 500. In various embodiments, socket connector 527 may be a 5-socket straight connector. A wire 514 may electrically connect socket connector 527 and a P− terminal 207 of power supply unit 502. In various embodiments, power supply unit 502 supplies DC, for example 5 V to 7 V DC. In various embodiments, strain gauge 305 may be electrically connected to P− terminal 207 of power supply unit 502 via wire 310a, wiring connector 320, a wire 526a, pin connector 525, socket connector 527, and wire 514. A wire 516 may electrically connect socket connector 527 and an S− terminal 208 of multimeter 520. In various embodiments, strain gauge 305 may be electrically connected to the S− terminal 208 of multimeter 520 via wire 310b, wiring connector 320, wire 526b, pin connector 525, socket connector 527, and wire 516. A wire 510 may electrically connect socket connector 527 and an S− terminal 208 of multimeter 522. In various embodiments, strain gauge 307 may be coupled to the S− terminal of multimeter 522 via wire 310c, wiring connector 320, wire 526c, pin connector 525, socket connector 527, and wire 510. A wire 512 may electrically connect socket connector 527 and a P− terminal 207 of power supply unit 504. In various embodiments, power supply unit 504 supplies DC, for example 5 V to 7 V DC. In various embodiments, strain gauge 307 may be coupled to the P-terminal of power supply unit 504 via wire 310d, wiring connector 320, wire 526d, pin connector 525, socket connector 527, and wire 512.

In various embodiments, upon connecting load cell 300 to bridge completion unit 500, a load may be applied to stressroll wheel 160 (FIG. 1) and the outputs from strain gauge 305 and strain gauge 307 may be compared to confirm load cell 300 is canceling and/or balancing off-axis loading. For example, the output of strain gauge 305 may be measured by multimeter 520 and may be compared to the output of strain gauge 307, which is measured by multimeter 522. In various embodiments, multimeters 520 and 522 display, and/or measure, voltage in millivolts. If load cell 300 is accurately measuring, balancing, and/or cancelling side loads experienced by arm 164 and arm 166, multimeter 520 and multimeter 522 will display about the same voltage, as used herein "about the same voltage" means±5.0%.

Multimeter 520 and multimeter 522 displaying different voltages may indicate that at least one of strain gauges 305, 306, 307, or 308 is not oriented correctly. For example, strain gauge 308 not being oriented at a 90° angle relative to strain gauge 305 may result in multimeter 520 and multimeter 522 displaying unequal voltages. Multimeter 520 and multimeter 522 displaying different voltages may be indicative of a poor bonding between at least one of the strain gauges 305, 306, 307, or 308 and arm 164 or arm 166. Multimeter 520 and multimeter 522 displaying different voltages may indicate that the load cell body (i.e., bracket 162) is not machined correctly. For example, with momentary reference to FIG. 3B, arm 164 having a greater thickness than arm 166 may affect output of at least one of the strain gauges 305, 306, 307, or 308.

With reference to FIG. 1, testing an accuracy of load cell 300 may help ensure a correct load is being applied to aircraft wheel 150. For example, if load cell 300 is not cancelling and/or balancing off-axis load, too much force F2 or too little force F2 may be applied to aircraft wheel 150. Applying an incorrect amount of force F2 during a stress-rolling of aircraft wheel 150 may decrease a reliability of aircraft wheel 150 and may lead to premature failure of aircraft wheel 150. Calibrating and/or testing load cell 300 to ensure any off-axis load is being properly balanced and/or cancelled may allow for a more exact and more accurate measurement of the compressive force F2 being applied to aircraft wheel 150 by stressroll wheel 160.

Figure 6:
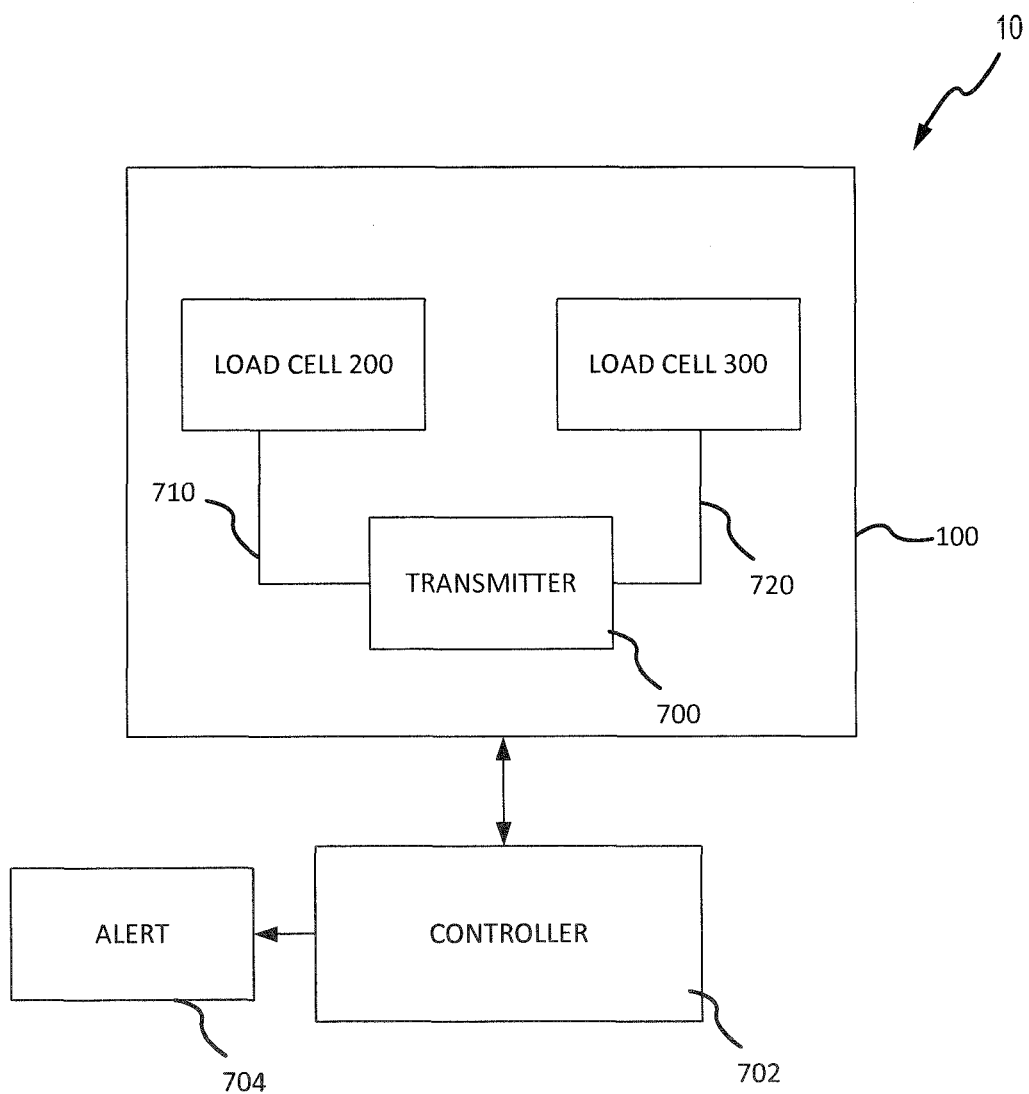
FIGS. 6 and 7 illustrate a schematic view of a stress load measurement system, in accordance with various embodiments.

With reference to FIG. 6, in various embodiments, a stress load measurement system 10 may comprise load cell 200 and load cell 300 coupled to, or otherwise in electrical communication with, a transmitter 700. Load cell 200 may be connected to transmitter 700 via a cable 710. Load cell 300 may be connected to transmitter 700 via a cable 720. Coupling load cell 200 and load cell 300 to transmitter 700 completes the Wheatstone bridge (FIGS. 4A and 4B) and allows stress load measurement system 10 to analyze the output of load cells 200 and 300 during operation of stressroll assembly 100.

Transmitter 700 may be within or otherwise coupled to stressroll assembly 100. Transmitter 700 may be in communication with a controller 702. In various embodiments, the various components (e.g., transmitter 700 and controller 702) may communicate via wireless communications. For example, transmitter 700 may wirelessly transmit data received from load cells 200 and 300 to controller 702.

A controller as disclosed herein may include one or more processors. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

With reference to FIG. 6 and FIGS. 4A and 4B, controller 702 may have instructions stored thereon, which allow controller 702 to display a signal or an alert 704, when the voltage between S+ terminal 206 and S− terminal 208 of the Wheatstone bridge exceeds a certain threshold value. For example, if a voltage between S+ terminal 206 and S− terminal 208 is greater than 5 millivolts, controller 702 may display alert 704 to indicate that side load is not being balanced and/or cancelled. Controller 702 may have instructions stored thereon, which allow controller 702 to compare the resistance of strain gauge 201 to the resistance of strain gauge 203. Controller 702 may have instructions stored thereon, which allow controller 702 to display alert 704 when the difference in the resistance of strain gauge 201 and 203 is above a predetermined threshold. For example, controller 702 may have instructions stored thereon that allow controller 702 to display alert 704 if the difference in resistance of strain gauge 201 and strain gauge 203 is greater than 5.0%. Controller 702 may have instructions stored thereon that allow controller 702 to display alert 704 if the difference in resistance of strain gauge 201 and strain gauge 203 is greater than 1.0%. Controller 702 may have instructions stored thereon, which allow controller 702 to compare the resistance of strain gauge 305 to the resistance of strain gauge 307. Controller 702 may have instructions stored thereon, which allow controller 702 to display alert 704 when the difference in the resistance of strain gauge 305 and 307 is above a predetermined threshold. For example, controller 702 may have instructions stored thereon that allow controller 702 to display alert 704 if the difference in resistance of strain gauge 305 and strain gauge 307 is greater than 5.0%. Controller 702 may have instructions stored thereon that allow controller 702 to display alert 704 if the difference in resistance of strain gauge 305 and strain gauge 307 is greater than 1.0%.

Controller 702 may have instructions stored thereon, which allow controller 702 to compare the ratio of the resistance of strain gauge 201 to the resistance of strain gauge 204 to the ratio of the resistance of strain gauge 203 to the resistance of strain gauge 202. Controller 702 may have instructions stored thereon, which allow controller 702 to display alert 704 when the difference in the ratio of the resistance of strain gauge 201 to strain gauge 204 and the ratio of the resistance of strain gauge 203 to strain gauge 202 is above a predetermined threshold. For example, controller 702 may have instructions stored thereon that allow controller to display alert 704 if there is greater than a 5.0% difference in the ratios. Controller 702 may have instructions stored thereon that allow controller to display alert 704 if there is greater than a 1.0% difference in the ratios.

Controller 702 may have instructions stored thereon, which allow controller 702 to compare the ratio of the resistance of strain gauge 305 to the resistance of strain gauge 308 to the ratio of the resistance of strain gauge 307 to the resistance of strain gauge 306. Controller 702 may have instructions stored thereon, which allow controller 702 to display alert 704 when the difference in the ratio of the resistance of strain gauge 305 to strain gauge 308 and the ratio of the resistance of strain gauge 307 to strain gauge 306 is above a predetermined threshold. For example, controller 702 may have instructions stored thereon that allow controller 702 to display alert 704 if there is greater than a 5.0% difference in the ratios. Controller 702 may have instructions stored thereon that allow controller 702 to display alert 704 if there is greater than a 1.0% difference in the ratios.

The alert 704 displayed by controller 702 may be used to indicate a need for maintenance on one or more components of stressroll assembly 100. In various embodiments, upon receiving an alert 704 from controller 702, load cell 200 and load cell 300 may be "unplugged" from cable 710 and cable 720, respectively, and may be plugged into to bridge completion unit 400 and bridge completion unit 500, respectively, for calibration and/or testing of the strain gauges on bracket 172 and the strain gauges on bracket 162.

Figure 7:
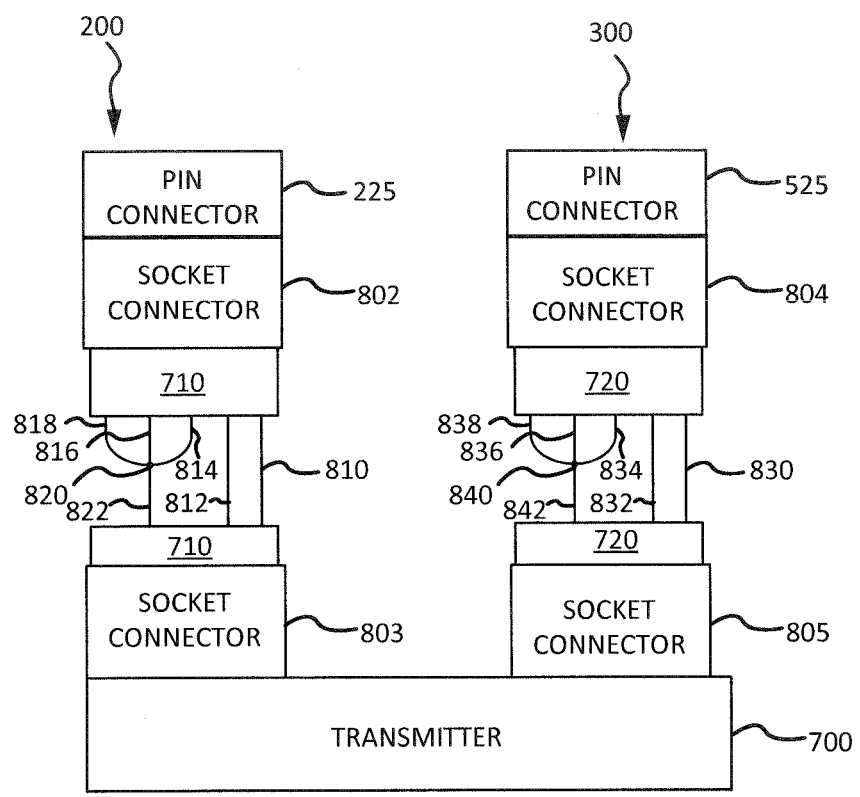

FIG. 7 illustrates further detail of the connection between transmitter 700 and load cells 200 and 300, in accordance with various embodiments. In FIG. 7, a portion of the outer casing of cable 710 has been removed to show the wires within cable 710, and a portion of the outer casing of cable 720 has been removed to show the wires within cable 720. In various embodiments, load cell 200 may be connected to transmitter 700 by removably coupling pin connector 225, which is connected to load cell 200 (FIG. 4C), to a socket connector 802 connected to cable 710. Socket connector 802 may be connected to a first end of cable 710. Transmitter 700 may be connected to a socket connector 803 connected to a second end of cable 710. In various embodiment, load cell 200 may be connected to transmitter 700 by "unplugging" pin connector 225 from socket connector 227 of bridge completion unit 400 (FIG. 4D) and "plugging" pin connector 225 into socket connector 802.

Load cell 300 may be connected to transmitter 700 by removably coupling the pin connector 525, which is connected to load cell 300 (FIG. 4E), to a socket connector 804 connected to cable 720. Socket connector 804 may be connected to a first end of cable 720. Transmitter 700 may be connected to a socket connector 805 connected to a second end of cable 720. In various embodiment, load cell 300 may be connected to transmitter 700 by "unplugging" pin connector 525 from socket connector 527 of bridge completion unit 500 (FIG. 4F) and "plugging" pin connector 525 into socket connector 804.

With reference to FIG. 7 and FIG. 4C, wire 810 within cable 710 may be connected to strain gauge 203 via socket connector 802, pin connector 225, wire 226c, and wire 210c. Wire 812 within cable 710 may be connected to strain gauge 202 via socket connector 802, pin connector 225, wire 226e, and wire 210e. Wire 814 within cable 710 may be connected to strain gauge 203 via socket connector 802, pin connector 225, wire 226d, and wire 210d. Wire 816 within cable 710 may be connected to strain gauge 201 via socket connector 802, pin connector 225, wire 226b, and wire 210b. Wire 818 within cable 710 may be connected to strain gauge 201 via socket connector 802, pin connector 225, wire 226a, and wire 210a. Wires 814, 816, and 818 may be spliced together at spliced connection 820. Wires 814, 816, and 816 may be connected to socket connector 803 via a single wire 822 extending between spliced connection 820 and socket connector 803.

With reference to FIG. 7 and FIG. 4E, wire 830 within cable 720 may be connected to strain gauge 307 via socket connector 804, pin connector 525, wire 526d, and wire 310d. Wire 832 within cable 720 may be connected to strain gauge 305 via socket connector 804, pin connector 525, wire 526a, and wire 310a. Wire 834 within cable 720 may be connected to strain gauge 305 via socket connector 804, pin connector 525, wire 526b, and wire 310b. Wire 836 within cable 720 may be connected to strain gauge 306 via socket connector 804, pin connector 525, wire 526e, and wire 310e. Wire 838 within cable 720 may be connected to strain gauge 307 via socket connector 804, pin connector 525, wire 526c, and wire 310c. Wires 834, 836, and 838 may be spliced together at spliced connection 840. Wires 834, 836, and 836 may all be connected to socket connector 805 via a single wire 842 extending between spliced connection 840 and socket connector 805. Connecting load cell 200 and load cell 300 to transmitter 700 may complete the Wheatstone bridge included on load cell 200 and load cell 300.

Figure 5A:
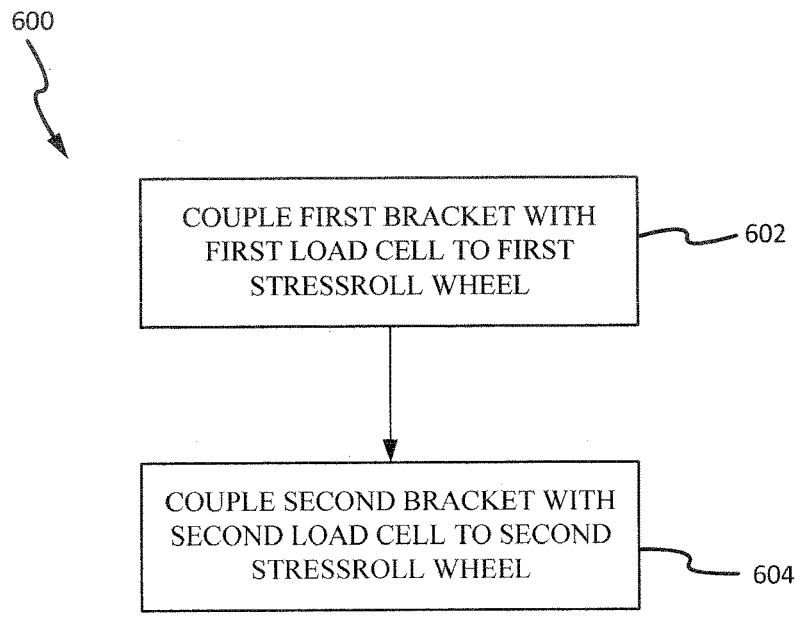
FIGS. 5A and 5B illustrate a method of measuring force applied during a stressroll process, in accordance with various embodiments.

With reference to FIG. 5A, a method 600 of measuring force applied during a stressroll process comprises coupling a first bracket comprising a first load cell to a first stressroll wheel (step 602). In various embodiments, the first load cell may form a first half of a Wheatstone bridge. Method 600 further comprises coupling a second bracket comprising a second load cell to a second stressroll wheel (Step 604). In various embodiments, the second load cell may form a second half of the Wheatstone bridge.

In various embodiments, with combined reference to FIG. 2, FIGS. 4A and 4B, and FIG. 5A, step 602 may comprise coupling first bracket 172 comprising first load cell 200 to first stressroll wheel 170. First load cell 200 may form a first half of a Wheatstone bridge. Step 604 may comprise coupling second bracket 162 comprising second load cell 300 to second stressroll wheel 160. Second load cell 300 may form a second half of the Wheatstone bridge.

In various embodiments, with combined reference to FIG. 5A and FIGS. 3A and 3B, first load cell 200 may comprise first strain gauge 201 coupled to first arm 176 of first bracket 172, and second strain gauge 203 coupled to second arm 174 of first bracket 172. Second load cell 300 may comprise third strain gauge 305 coupled to first arm 166 of second bracket 162, and fourth strain gauge 307 coupled to second arm 164 of second bracket 162.

Figure 5B:
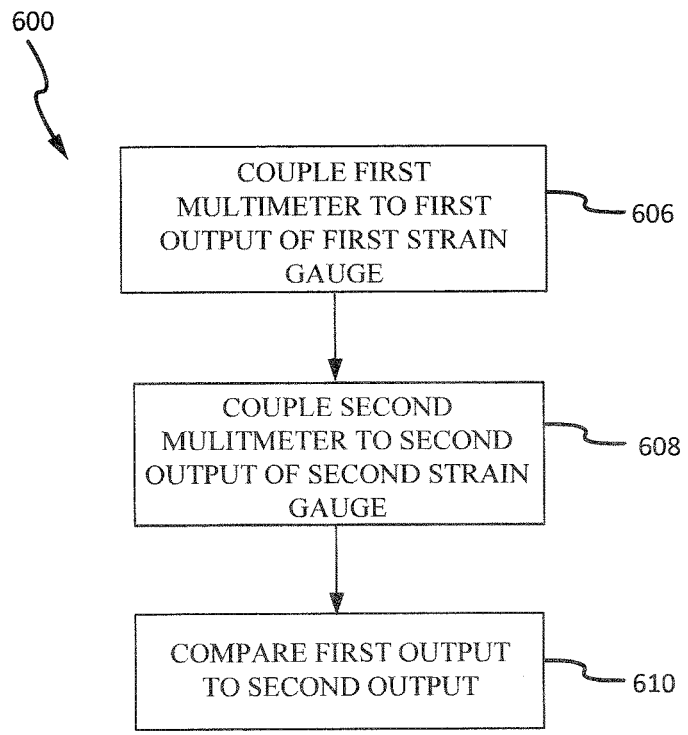

With reference to FIG. 5B, in various embodiments, method 600 may further comprise coupling a first multimeter to a first output of the first strain gauge (step 606), coupling a second multimeter to a second output of the second strain gauge (step 608), and comparing the first output to the second output (step 610).

In various embodiments, with combined reference to FIGS. 4C and 4D and FIG. 5B, step 606 may comprise coupling first multimeter 420 to a first output of first strain gauge 201. Step 608 may comprise coupling second multimeter 422 to a second output of second strain gauge 203. Step 610 may comprise comparing the first output from first strain gauge 201 to the second output from second strain gauge 203.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stress load measurement system for a stressroll assembly, comprising:
   a first bracket comprising a first load cell, the first load cell including,
      a first strain gauge and a second strain gauge mounted to a first arm of the first bracket, and
      a third strain gauge and a fourth strain gauge mounted to a second arm of the first bracket;
   a first stressroll wheel mounted to a first axle, wherein the first axle extends between the first arm of the first bracket and the second arm of the first bracket;
   a second bracket comprising a second load cell, the second load cell including,
      a fifth strain gauge and a sixth strain gauge mounted to a first arm of the second bracket, and
      a seventh strain gauge and an eighth strain gauge mounted to a second arm of the second bracket; and
   a second stressroll wheel mounted to a second axle, wherein the second axle extends between the first arm of the second bracket and the second arm of the second bracket, and
   wherein the first load cell forms a first half of a Wheatstone bridge and the second load cell forms a second half of the Wheatstone bridge.

2. The stress load measurement system of claim 1, wherein the first strain gauge and the third strain gauge are connected to a positive power supply terminal and a positive signal supply terminal.

3. The stress load measurement system of claim 2, wherein the fifth strain gauge and the seventh strain gauge are connected to a negative power supply terminal and a negative signal supply terminal.

4. The stress load measurement system of claim 1, wherein the first strain gauge is configured to measure at least one of a tension or a compression along a first length of the first arm of the first bracket, and wherein the third strain gauge is configured to measure at least one of a tension or a compression along a second length of the second arm of the first bracket.

5. The stress load measurement system of claim 1, wherein the first strain gauge is coupled to a first multimeter and the third strain gauge is coupled to a second multimeter.

6. The stress load measurement system of claim 1, further including a transmitter coupled to the first load cell and the second load cell.

7. The stress load measurement system of claim 1, wherein the second strain gauge is oriented orthogonal to the first strain gauge, and wherein the fourth strain gauge is oriented orthogonal to the third strain gauge.

8. The stress load measurement system of claim 1, wherein the is configured to measure at least one of a tension or a compression along a first length of the first arm of the second bracket, and wherein the seventh strain gauge is configured to measure at least one of a tension or a compression along a second length of the second arm of the second bracket.

9. A stressroll assembly, comprising
   a first bracket comprising a first load cell, wherein the first oad cell forms a first half of a Wheatstone bridge;
   a first stressroll wheel mounted to a first axle, wherein the first axle extends between a first arm of the first bracket and a second arm of the first bracket;
   a second bracket comprising a second load cell, wherein the second load cell forms a second half of the Wheatstone bridge; and
   a second stressroll wheel mounted to a second axle, wherein the second axle extends between a first arm of the second bracket and a second arm of the second bracket.

10. The stressroll assembly of claim 9, wherein the first load cell comprises:
   a first strain gauge mounted to the first arm of the first bracket; and
   a second strain gauge mounted to the second arm of the first bracket.

11. The stressroll assembly of claim 10, wherein the first strain gauge and the second strain gauge are connected to a positive power supply terminal and a positive signal supply terminal.

12. The stressroll assembly of claim 10, wherein the second load cell comprises:
   a third strain gauge mounted to the first arm of the second bracket; and
   a fourth strain gauge mounted to the second arm of the second bracket.

13. The stressroll assembly of claim 12, wherein the third strain gauge and the fourth strain gauge are connected to a negative power supply terminal and a negative signal supply terminal.

14. The stressroll assembly of claim 9, further including a transmitter coupled to the first load cell and the second load cell.

15. The stressroll assembly of claim 9, wherein the first stressroll wheel is configured to apply a first compressive force to a wheel, and wherein the second stressroll wheel is configured to apply a second compressive force to the wheel.

16. The stressroll assembly of claim 15, wherein the first stressroll wheel is configured to apply the first compressive force to a bead seat on the wheel.

17. A method of measuring force applied during a stressroll process, comprising:
   coupling a first bracket comprising a first load cell to a first stressroll wheel, wherein the first load cell forms a first half of a Wheatstone bridge, and wherein the first stressroll wheel is mounted to a first axle extending between a first arm of the first bracket and a second arm of the first bracket; and coupling a second bracket comprising a second load cell to a second stressroll wheel, wherein the second load cell forms a second half of the Wheatstone bridge, and wherein the second stressroll wheel is mounted to a second axle extending between a first arm of the second bracket and a second arm of the second bracket.

18. The method of claim 17, wherein the first load cell comprises:

a first strain gauge coupled to the first arm of the first bracket; and a second strain gauge coupled to the second arm of the first bracket.

19. The method of claim 18, further comprising:

coupling a first multimeter to a first output of the first strain gauge;

coupling a second multimeter to a second output of the second strain gauge; and comparing the first output to the second output.

\* \* \* \* \*

UNITED STATES PATENT AND TRADEMARK OFFICE
CERTIFICATE OF CORRECTION

PATENT NO. : 10,031,037 B1
APPLICATION NO. : 15/595198
DATED : July 24, 2018
INVENTOR(S) : Thomas Freshour It is certified that error appears in the above-identified patent and that said Letters Patent is hereby corrected as shown below:

In the Claims

In Column 16, Line 12 please delete, "wherein the is configured" and therefore insert -- wherein the fifth strain gauge is configured --

In Column 16, Line 21 please delete, "oad cell" and therefore insert -- load cell --

Signed and Sealed this
Eighteenth Day of September, 2018

Andrei Iancu
*Director of the United States Patent and Trademark Office*